(12) United States Patent
Higashi et al.

(10) Patent No.: US 12,227,608 B2
(45) Date of Patent: Feb. 18, 2025

(54) METHOD FOR PRODUCING LOW-MOLECULAR WEIGHT POLYTETRAFLUOROETHYLENE, AND POWDER

(71) Applicants: DAIKIN INDUSTRIES, LTD., Osaka (JP); OSAKA UNIVERSITY, Suita (JP)

(72) Inventors: Chisato Higashi, Osaka (JP); Eiji Masuda, Osaka (JP); Masayuki Tsuji, Osaka (JP); Akira Shimodo, Osaka (JP); Yasuhiro Nakano, Osaka (JP); Akihiro Oshima, Suita (JP)

(73) Assignees: DAIKIN INDUSTRIES, LTD., Osaka (JP); OSAKA UNIVERSITY, Osaka (JP)

( * ) Notice: Subject to any disclaimer, the term of this patent is extended or adjusted under 35 U.S.C. 154(b) by 218 days.

(21) Appl. No.: 17/571,031

(22) Filed: Jan. 7, 2022

(65) Prior Publication Data
US 2022/0127391 A1      Apr. 28, 2022

Related U.S. Application Data

(63) Continuation of application No. PCT/JP2020/027178, filed on Jul. 13, 2020.

(30) Foreign Application Priority Data

Jul. 12, 2019   (JP) .................................. 2019-130586

(51) Int. Cl.
C08F 8/50        (2006.01)
C08F 114/26      (2006.01)
C08J 3/28        (2006.01)

(52) U.S. Cl.
CPC .............. *C08F 8/50* (2013.01); *C08F 114/26* (2013.01)

(58) Field of Classification Search
CPC ... C08F 5/50; C08F 114/26; C08F 8/50; C08J 3/28
See application file for complete search history.

(56) References Cited

U.S. PATENT DOCUMENTS 10,538,605 B2 *   1/2020   Yoshida .................... C08J 3/28
2019/0023818 A1   1/2019   Yoshida et al.
(Continued)

FOREIGN PATENT DOCUMENTS

JP      10-147617 A      6/1998
JP      10-316762 A      12/1998
(Continued)

OTHER PUBLICATIONS

International Search Report for PCT/JP2020/027178 dated Oct. 6, 2020 [PCT/ISA/210].
(Continued)

*Primary Examiner* — Catherine S Branch
(74) *Attorney, Agent, or Firm* — Sughrue Mion, PLLC

(57) ABSTRACT

A method for producing low-molecular-weight polytetrafluoroethylene which includes: (1) irradiating high-molecular-weight polytetrafluoroethylene with radiation to a dose of 250 kGy or higher substantially in the absence of oxygen to provide low-molecular-weight polytetrafluoroethylene having a melt viscosity at 380° C. of $1.0 \times 10^2$ to $7.0 \times 10^5$ Pa·s. Also disclosed is a powder containing the low-molecular-weight polytetrafluoroethylene, the powder being substantially free from any of perfluorooctanoic acid and salts thereof.

3 Claims, 5 Drawing Sheets

(56) References Cited

U.S. PATENT DOCUMENTS

| | | |
|---|---|---|
| 2019/0023856 A1 | 1/2019 | Yoshida et al. |
| 2020/0123283 A1 | 4/2020 | Yoshida et al. |
| 2021/0040274 A1 | 2/2021 | Yoshida et al. |
| 2021/0347953 A1 | 11/2021 | Oshima et al. |

FOREIGN PATENT DOCUMENTS

| | | | |
|---|---|---|---|
| JP | 2015-71793 A | 4/2015 | |
| JP | 2018-024868 A | 2/2018 | |
| JP | 2018-024869 A | 2/2018 | |
| WO | WO-2018026017 A1 * | 2/2018 | ............... C08F 8/50 |
| WO | 2020/013336 A1 | 1/2020 | |

OTHER PUBLICATIONS

Extended European Search Report dated Jun. 28, 2023 in European Application No. 20840639.7.
International Preliminary Report on Patentability dated Jan. 18, 2022 with a Translation of the Written Opinion of the International Searching Authority in Application No. PCT/JP2020/027178.

\* cited by examiner

METHOD FOR PRODUCING LOW-MOLECULAR WEIGHT POLYTETRAFLUOROETHYLENE, AND POWDER

CROSS REFERENCE TO RELATED APPLICATIONS

This application is a Rule 53(b) Continuation of International Application No. PCT/JP2020/027178 filed Jul. 13, 2020, claiming priority based on Japanese Patent Application No. 2019-130586 filed Jul. 12, 2019, the respective disclosures of which are incorporated herein by reference in their entirety.

TECHNICAL FIELD

The disclosure relates to methods for producing low-molecular-weight polytetrafluoroethylene, and powders.

BACKGROUND ART

Low-molecular-weight polytetrafluoroethylene (also referred to as "polytetrafluoroethylene wax" or "polytetrafluoroethylene micropowder") having a molecular weight of several thousands to several hundreds of thousands has excellent chemical stability and a very low surface energy, as well as low fibrillatability. Thus, low-molecular-weight polytetrafluoroethylene is used as an additive for improving the smoothness and the texture of film surfaces in production of articles such as plastics, inks, cosmetics, coating materials, and greases (for example, see Patent Literature 1).

Examples of known methods for producing low-molecular-weight polytetrafluoroethylene include polymerization, radiolysis, and pyrolysis. Conventional radiolysis is commonly such that radiation is applied to high-molecular-weight polytetrafluoroethylene in the air atmosphere to provide low-molecular-weight polytetrafluoroethylene.

Also examined are methods of reducing perfluorocarboxylic acids and salts thereof that may be generated as by-products of radiolysis (for example, see Patent Literature documents 2 and 3).

CITATION LIST

Patent Literature

Patent Literature 1: JP H10-147617 A
Patent Literature 2: JP 2018-24868 A
Patent Literature 3: JP 2018-24869 A

SUMMARY

The disclosure relates to a method for producing low-molecular-weight polytetrafluoroethylene, the method including: (1) irradiating high-molecular-weight polytetrafluoroethylene with radiation to a dose of 250 kGy or higher substantially in the absence of oxygen to provide low-molecular-weight polytetrafluoroethylene having a melt viscosity at 380° C. of $1.0 \times 10^2$ to $7.0 \times 10^5$ Pa·s.

ADVANTAGEOUS EFFECTS

The disclosure can provide methods for producing low-molecular-weight polytetrafluoroethylene that are less likely to generate perfluorooctanoic acid and salts thereof. The disclosure also can provide powders of low-molecular-weight polytetrafluoroethylene containing perfluorooctanoic acid and salts thereof only in a small amount.

DESCRIPTION OF EMBODIMENTS

Figure 1:
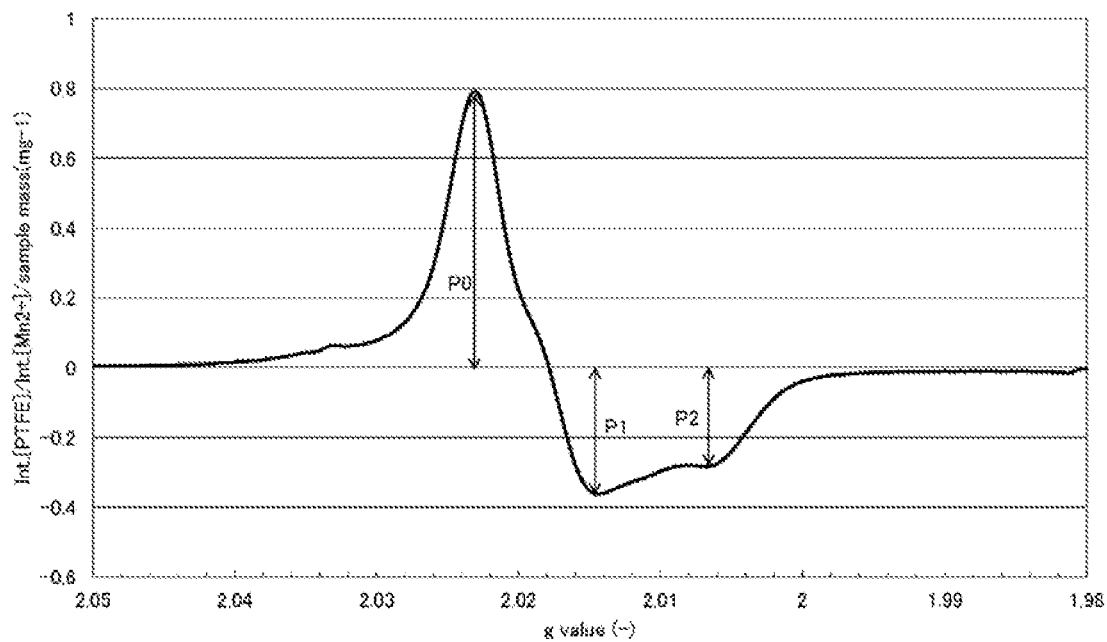
FIG. 1 is a diagram showing exemplary P0, P1, and P2 in an electron spin resonance (ESR) spectrum.

The disclosure will be specifically described hereinbelow.
The disclosure relates to a method for producing low-molecular-weight polytetrafluoroethylene (PTFE), including (1) irradiating high-molecular-weight PTFE with radiation to a dose of 250 kGy or higher substantially in the absence of oxygen to provide low-molecular-weight PTFE having a melt viscosity at 380° C. of $1.0 \times 10^2$ to $7.0 \times 10^5$ Pa·s.

Conventional irradiation of high-molecular-weight PTFE with radiation in the air atmosphere generates not only low-molecular-weight PTFE having a lower melt viscosity than high-molecular-weight PTFE but also C4-C14 perfluorocarboxylic acids or salts thereof. These compounds are non-naturally occurring, difficult-to-decompose substances and include C8 perfluorooctanoic acid and salts thereof, C9 perfluorononanoic acid and salts thereof, and C10 perfluorodecanoic acid, C11 perfluoroundecanoic acid, C12 perfluorododecanoic acid, C13 perfluorotridecanoic acid, and C14 perfluorotetradecanoic acid and salts thereof which are pointed out that they are highly bioaccumulative.

Irradiation of high-molecular-weight PTFE with radiation under conventional irradiation conditions unfortunately generates 25 ppb or more of C8 perfluorooctanoic acid or salts thereof.

Irradiation of high-molecular-weight PTFE with radiation substantially in the absence of oxygen in the production method of the disclosure is less likely to generate perfluorooctanoic acid and salts thereof. Commonly, low-molecular-weight PTFE is not easily obtained through irradiation in the absence of oxygen. In the production method of the disclosure, however, a specific dose of irradiation enables production of low-molecular-weight PTFE even in the absence of oxygen.

The production method of the disclosure is also less likely to generate C4-C14 perfluorocarboxylic acids and salts thereof.

The production method of the disclosure does not require any additional step, such as a heat treatment step, for decomposing the perfluorocarboxylic acids and salts thereof generated by the irradiation.

The production method of the disclosure is also less likely to generate C4-C14 perfluorosulfonic acids and salts thereof.

The production method of the disclosure can produce low-molecular-weight PTFE that is less likely to be discolored (has high whiteness and is less yellowish) by heating.

The production method of the disclosure can provide low-molecular-weight PTFE capable of providing products excellent in tensile strength when added to matrix materials (in particular, resins such as polycarbonate).

The dose of radiation in the step (1) is 250 kGy or higher. Irradiation with radiation to a dose within the above range can decompose the high-molecular-weight PTFE into a low-molecular-weight component even substantially in the absence of oxygen.

The dose is preferably 300 kGy or higher, more preferably 350 kGy or higher, still more preferably 400 kGy or higher. The dose is preferably 1000 kGy or lower, more preferably 700 kGy or lower, still more preferably 650 kGy or lower.

The dose means the absorbed dose.

Examples of the radiation include any ionizing radiation, such as electron beams, gamma rays, X-rays, neutron beams, and high energy ions. Electron beams or gamma rays are preferred.

The irradiation temperature of the radiation may be any temperature from 5° C. to the melting point of high-molecular-weight PTFE. It is known that the molecular chain of high-molecular-weight PTFE is crosslinked at around the melting point thereof. In order to provide low-molecular-weight PTFE, the irradiation temperature is preferably 320° C. or lower, more preferably 300° C. or lower, still more preferably 260° C. or lower, further preferably lower than 100° C., particularly preferably lower than 50° C. From an economic viewpoint, the irradiation is preferably performed at normal temperature. The normal temperature may refer to a temperature range from 5° C. to 60° C., preferably from 10° C. to 50° C., more preferably from 15° C. to 45° C., including heat generated during the irradiation.

The irradiation in the step (1) is performed substantially in the absence of oxygen. The phrase "substantially in the absence of oxygen" herein means that the oxygen concentration in the atmosphere for performing a step is 0.5 vol % or less. In order to further reduce generation of the perfluorocarboxylic acids and salts thereof, the oxygen concentration is preferably 0.25 vol % or less, more preferably 0.1 vol % or less, still more preferably 0.01 vol % or less, particularly preferably 0.001 vol % or less. The lower limit may be, but is not limited to, a value lower than the detection limit.

The oxygen concentration can be determined by a method of analyzing a gaseous phase inside a space for performing a step by gas chromatography, a method of using an oxygen concentration meter, or a method of observing the color tone of an oxygen detection agent placed in the space.

The irradiation in the step (1) is preferably performed in an airtight container. The airtight container refers to a container that can be sealed to enable adjustment of the oxygen concentration inside the container. The airtight container may be coupled with pipes for intake and exhaust of inert gas and for exhaust of the gas inside the airtight container, and may be coupled with components such as other pipes, caps, valves, and flanges which are not opened during the irradiation. The airtight container may have any shape, such as a cylindrical shape, a prismatic shape, or a spherical shape, or may be a capacity-variable bag. The container may be formed from any material, such as metal, glass, or a polymer. The material and structure of the airtight container should be radiolucent and non-radiolytic. The airtight container needs not to be a pressure-resistant container.

The production method of the disclosure may include (2) feeding the high-molecular-weight PTFE into an airtight container substantially in the absence of oxygen before the step (1). The phrase "feeding the high-molecular-weight PTFE into an airtight container substantially in the absence of oxygen" means that the oxygen concentration of the atmosphere inside the airtight container after the feeding is within the range described above.

An example of a method of feeding the high-molecular-weight PTFE into an airtight container substantially in the absence of oxygen is a method in which the high-molecular-weight PTFE and at least one selected from the group consisting of inert gas and an oxygen absorbent are fed into the airtight container.

An example of a method of feeding the materials mentioned above into the airtight container is a method in which the high-molecular-weight PTFE is placed in the airtight container, and then the airtight container is filled with the inert gas or vacuum-evacuated. In the method of using the oxygen adsorbent, examples of methods include a method in which the high-molecular-weight PTFE and the oxygen adsorbent are placed in the airtight container in the air and then the airtight container is sealed, a method in which the high-molecular-weight PTFE and the oxygen adsorbent are placed in the airtight container and then the airtight container is filled with the inert gas, and a method in which the high-molecular-weight PTFE and the oxygen adsorbent are placed in the airtight container and then the airtight container is vacuum-evacuated.

The inert gas needs to be a gas inert to a reaction of generating low-molecular-weight PTFE by irradiation. Examples of the inert gas include gases such as nitrogen, helium, and argon. Preferred among these is nitrogen.

The inert gas has an oxygen content of preferably 0.5 vol % or less, more preferably 0.25 vol % or less, still more preferably 0.1 vol % or less, further more preferably 0.01 vol % or less, particularly preferably 0.001 vol % or less. The lower limit may be, but is not limited to, a value lower than the detection limit. With the inert gas having an oxygen content within the above range, the perfluorocarboxylic acids and salts thereof are much less likely to generate upon irradiation of the high-molecular-weight PTFE with radiation in the step (1).

The oxygen content can be checked by gas chromatography analysis, as well as by the use of an oxygen concentration meter or oxygen detection paper.

The oxygen adsorbent may be any adsorbent having a function of adsorbing oxygen. Examples thereof include known oxygen adsorbents including inorganic oxygen adsorbents such as iron-based, zinc-based, or hydrosulfite-based adsorbents, and organic oxygen adsorbents such as ascorbic acid-based, polyhydric alcohol-based, or activated carbon-based adsorbents. The oxygen adsorbent may be of either a water-dependent type which uses water for a reaction with oxygen or self-reactive type which does not use water. Preferred is a self-reactive type. The oxygen adsorbent is preferably an iron-based self-reactive oxygen adsorbent, quicklime, or the like, and is more preferably an iron-based self-reactive oxygen adsorbent.

The amount of the oxygen adsorbent fed is preferably an amount that can maintain the oxygen concentration inside the airtight container within the range described above.

The irradiation in the step (1) is preferably performed substantially in the absence of halogenated polymers containing a halogen atom other than a fluorine atom. In the production method of the disclosure, high-molecular-weight PTFE can be decomposed into a low-molecular-weight component even in the absence of the halogenated polymers. Moreover, the perfluorocarboxylic acids and salts thereof are less likely to generate.

The halogenated polymers encompass polymers containing a halogen atom other than a fluorine atom together with a fluorine atom.

Examples of the halogenated polymers include polymers containing a chlorine atom such as polyvinyl chloride (PVC), polyvinylidene chloride (PVdC), and polychlorotrifluoroethylene (PCTFE).

The phrase "substantially in the absence of the halogenated polymers" means that the amount of the halogenated polymers is less than 0.001% by mass relative to the high-molecular-weight PTFE. The amount is preferably 0.0001% by mass or less. The lower limit thereof may be, but is not limited to, a value lower than the detection limit.

The irradiation in the step (1) is also preferably performed substantially in the absence of hydrocarbons, chlorinated hydrocarbons, alcohols, and carboxylic acids. In the production method of the disclosure, high-molecular-weight PTFE can be decomposed into a low-molecular-weight component even in the absence of these compounds. Moreover, the perfluorocarboxylic acids and salts thereof are less likely to generate.

Examples of the hydrocarbons include C1-C20 saturated hydrocarbons.

Examples of the chlorinated hydrocarbons include chlorinated products of C1-C18 saturated hydrocarbons.

Examples of the alcohols include C1-C12 monohydric saturated alcohols.

Examples of the carboxylic acids include C1-C13 saturated monocarboxylic acids.

The phrase "substantially in the absence" of these compounds means that the amount (total amount) of the compounds is less than 0.001% by mass relative to the high-molecular-weight PTFE. The amount is preferably 0.0001% by mass or less. The lower limit thereof may be, but is not limited to, a value lower than the detection limit.

The production method of the disclosure may further include (3) providing a molded article in response to heating the high-molecular-weight PTFE up to a temperature that is not lower than the primary melting point thereof before the step (1). In this case, the molded article obtained in the step (3) can be used as the high-molecular-weight PTFE in the step (1). In the case where the step (2) described above is also performed, the step (3) is preferably performed before the step (2).

The primary melting point is preferably 300° C. or higher, more preferably 310° C. or higher, still more preferably 320° C. or higher.

The primary melting point refers to the maximum peak temperature on an endothermic curve present on the crystal melting curve when unsintered high-molecular-weight PTFE is analyzed with a differential scanning calorimeter. The endothermic curve is obtainable by increasing the temperature at a temperature-increasing rate of 10° C./min using a differential scanning calorimeter.

The molded article in the step (3) has a specific gravity of preferably 1.0 g/cm$^3$ or higher, more preferably 1.5 g/cm$^3$ or higher, and preferably 2.5 g/cm$^3$ or lower. The molded article having a specific gravity within the above range can have smaller pores or irregularities on the surface, finally providing low-molecular-weight PTFE having a small specific surface area.

The specific gravity can be determined by water displacement.

The production method of the disclosure may further include pulverizing the molded article and providing powder of the PTFE after the step (3). The molded article may be first coarsely and then finely pulverized.

The production method of the disclosure may further include pulverizing the low-molecular-weight PTFE and providing a low-molecular-weight PTFE powder after the step (1).

The pulverization may be performed by any method, such as pulverization using a pulverizer. Examples of the pulverizer include impact-type pulverizers such as hammer mills, pin mills, and jet mills, and grinding-type pulverizers utilizing shearing force generated by unevenness between a rotary blade and a peripheral stator, such as cutter mills.

The pulverization temperature is preferably not lower than −200° C. but lower than 50° C. In the case of freeze pulverization, the pulverization temperature is usually −200° C. to −100° C. Still, the pulverization may be performed around room temperature (10° C. to 30° C.). Freeze pulverization is usually achieved by the use of liquid nitrogen, but such pulverization requires enormous equipment and high pulverization cost. In order to simplify the step and reduce the pulverization cost, the pulverization temperature is more preferably not lower than 10° C. but lower than 50° C., still more preferably 10° C. to 40° C., particularly preferably 10° C. to 30° C.

The pulverization may be followed by removal of fine particles and fibrous particles by air classification, and further followed by removal of coarse particles by classification.

In the air classification, the pulverized particles are sent to a cylindrical classification chamber by decompressed air and dispersed by swirl flow inside the chamber, and fine particles are classified by centrifugal force. The fine particles are collected from the central portion into a cyclone and a bag filter. Inside the classification chamber is provided a rotary device such as a circular-cone-like cone or rotor configured to achieve homogeneous gyrating movement of the pulverized particles and the air.

In the case of using classification cones, the classification point is adjusted by controlling the volume of the secondary air and the gap between classification cones. In the case of using a rotor, the air volume inside the classification chamber is adjusted by the number of rotations of the rotor.

Examples of the method of removing coarse particles include air classification, vibration sieving, and ultrasonic sieving with meshes. Air classification is preferred.

The production method of the disclosure may further include (4) exposing the low-molecular-weight PTFE obtained in the step (1) to air.

In the production method of the disclosure, the high-molecular-weight PTFE and the low-molecular-weight PTFE are preferably not kept at a temperature of 100° C. or higher or 50° C. or higher after the irradiation in the step (1) starts.

The high-molecular-weight PTFE and the low-molecular-weight PTFE are preferably not kept at the above temperature for 30 minutes or longer or 10 seconds or longer after the irradiation in the step (1) starts.

Next, a description is given on the high-molecular-weight PTFE to be irradiated with radiation in the step (1) of the production method of the disclosure and the low-molecular-weight PTFE obtained after the irradiation with radiation.

The low-molecular-weight PTFE has a melt viscosity at 380° C. of $1.0 \times 10^2$ to $7.0 \times 10^5$ Pa·s. The "low molecular weight" herein means that the melt viscosity is within the above range.

The melt viscosity is preferably $1.5 \times 10^3$ Pa·s or higher and $3.0 \times 10^5$ Pa·s or lower, more preferably $1.0 \times 10^5$ Pa·s or lower, still more preferably $9.0 \times 10^4$ Pa·s or lower.

The melt viscosity is a value determined by heating a 2-g sample at 380° C. for five minutes in advance and then keeping this sample at this temperature under a load of 0.7 MPa using a flow tester (available from Shimadzu Corp.) and a 2ϕ-8L die in conformity with ASTM D1238.

The high-molecular-weight PTFE to be irradiated with radiation preferably has a standard specific gravity (SSG) of 2.130 to 2.230. The standard specific gravity (SSG) is a value determined in conformity with ASTM D4895.

The high-molecular-weight PTFE has a significantly higher melt viscosity than the low-molecular-weight PTFE, and thus the melt viscosity thereof is difficult to measure accurately. In contrast, the melt viscosity of the low-molecular-weight PTFE is measurable, but the low-molecular-weight PTFE has difficulty in providing a molded article usable for measurement of standard specific gravity. Thus, the standard specific gravity thereof is difficult to measure accurately. Therefore, in the disclosure, the standard specific gravity is used as an indicator of the molecular weight of the high-molecular-weight PTFE to be irradiated with radiation, while the melt viscosity is used as an indicator of the molecular weight of the low-molecular-weight PTFE. For both the high-molecular-weight PTFE and the low-molecular-weight PTFE, no method for determining the molecular weight directly has been known so far.

The high-molecular-weight PTFE may contain perfluorooctanoic acid and salts thereof in a total amount of less than 25 ppb by mass, preferably not more than 20 ppb by mass, more preferably not more than 15 ppb by mass, still more preferably not more than 10 ppb by mass, particularly preferably not more than 5 ppb by mass, most preferably less than 5 ppb by mass. The lower limit thereof may be, but is not limited to, a value lower than the detection limit.

The amount of the perfluorooctanoic acid and salts thereof can be determined by liquid chromatography.

The low-molecular-weight PTFE has a melting point of 320° C. to 340° C., more preferably 324° C. to 336° C.

The melting point is defined as follows using a differential scanning calorimeter (DSC). Specifically, temperature calibration is performed in advance with indium and lead as standard samples. Then, about 3 mg of low-molecular-weight PTFE is put into an aluminum pan (crimped container), and the temperature is increased at a rate of 10° C./min within the temperature range of 250° C. to 380° C. under air flow at 200 ml/min. The minimum point of the heat of fusion within this range is defined as the melting point.

In the production method of the disclosure, the high-molecular-weight PTFE may be in any form, such as powder, a molded article of the high-molecular-weight PTFE, or shavings generated by cutting a molded article of the high-molecular-weight PTFE. The high-molecular-weight PTFE in the form of powder can easily provide powder of the low-molecular-weight PTFE.

The high-molecular-weight PTFE may be PTFE fine powder or PTFE molding powder. The PTFE fine powder is a powder (secondary particles) obtainable by emulsion polymerizing tetrafluoroethylene (TFE) to provide a PTFE aqueous dispersion and aggregating PTFE primary particles in the PTFE aqueous dispersion. The PTFE molding powder is a powder obtainable by suspension polymerizing TFE. The shavings are more specifically shavings generated by cutting the molding powder. The cutting can be performed by a known method during molding processing of the molding powder. The shavings may be those washed and coarsely pulverized by known methods. The PTFE fine powder and the PTFE molding powder each may be one obtained by granulating polymer particles by a known method. The high-molecular-weight PTFE in the form of PTFE fine powder can easily provide powder of the low-molecular-weight PTFE.

The low-molecular-weight PTFE obtainable by the production method of the disclosure may be in any form, and is preferably in the form of powder.

The low-molecular-weight PTFE obtainable by the production method of the disclosure, when in the form of powder, preferably has a specific surface area of 0.5 to 20 $m^2/g$.

For the low-molecular-weight PTFE powder, both of the following two types are demanded, i.e., a small specific surface area type having a specific surface area of not smaller than 0.5 $m^2/g$ but smaller than 7.0 $m^2/g$ and a large specific surface area type having a specific surface area of not smaller than 7.0 $m^2/g$ and not larger than 20 $m^2/g$.

The low-molecular-weight PTFE powder of a small specific surface area type has an advantage of easy dispersion in a matrix material such as a coating material.

In contrast, such powder disperses in a matrix material with a large dispersed particle size, i.e., with poor fine dispersibility.

The low-molecular-weight PTFE powder of a small specific surface area type preferably has a specific surface area of 1.0 $m^2/g$ or larger, while preferably 5.0 $m^2/g$ or smaller, more preferably 3.0 $m^2/g$ or smaller. Suitable examples of the matrix material include plastics and inks, as well as coating materials.

The low-molecular-weight PTFE powder of a large specific surface area type, when dispersed in a matrix material such as a coating material, has advantages of high surface-modifying effects, such as a small dispersed particle size in a matrix material and improved texture of the film surface, and a large amount of oil absorption. In contrast, such powder may not be easily dispersed in a matrix material, for example, may take a long time for dispersion, and may cause an increased viscosity of a coating material, for example.

The low-molecular-weight PTFE powder of a large specific surface area type preferably has a specific surface area of 8.0 $m^2/g$ or larger, while preferably 25 $m^2/g$ or smaller, more preferably 20 $m^2/g$ or smaller. Suitable examples of the matrix material include oils, greases, and coating materials, as well as plastics.

The specific surface area is determined by the BET method using a surface analyzer (trade name: BELSORP-mini II, available from MicrotracBEL Corp.), a gas mixture of 30% nitrogen and 70% helium as carrier gas, and liquid nitrogen for cooling.

The low-molecular-weight PTFE obtainable by the production method of the disclosure, when in the form of powder, preferably has an average particle size of 0.5 to 200 μm, more preferably 100 μm or smaller, still more preferably 50 μm or smaller, further preferably 25 μm or smaller, particularly preferably 10 μm or smaller. As mentioned here, powder having a relatively small average particle size can provide a film having much better surface smoothness when used as an additive for a coating material, for example.

The average particle size is equivalent to the particle size corresponding to 50% of the cumulative volume in the particle size distribution determined using a laser diffraction particle size distribution analyzer (HELOS & RODOS) available from JEOL Ltd. at a dispersive pressure of 3.0 bar without cascade impaction.

The production method of the disclosure can provide low-molecular-weight PTFE substantially free from perfluorooctanoic acid and salts thereof after the step (1). The low-molecular-weight PTFE obtainable by the production method of the disclosure may contain perfluorooctanoic acid and salts thereof in an amount of less than 25 ppb by mass, preferably not more than 20 ppb by mass, more preferably not more than 15 ppb by mass, still more preferably not more than 10 ppb by mass, particularly preferably not more than 5 ppb by mass, most preferably less than 5 ppb by mass. The lower limit of the amount may be, but is not limited to, a value lower than the detection limit.

The amount of the perfluorooctanoic acid and salts thereof can be determined by liquid chromatography.

The production method of the disclosure can also provide low-molecular-weight PTFE substantially free from C4-C14 perfluorocarboxylic acids and salts thereof. The low-molecular-weight PTFE obtainable by the production method of the disclosure may contain C4-C14 perfluorocarboxylic acids and salts thereof in a total amount of not more than 50 ppb by mass, preferably less than 25 ppb by mass, more preferably not more than 20 ppb by mass, still more preferably not more than 15 ppb by mass, further preferably not more than 10 ppb by mass, particularly preferably not more than 5 ppb by mass, most preferably less than 5 ppb by mass. The lower limit of the amount may be, but is not limited to, a value lower than the detection limit.

The amount of the perfluorocarboxylic acids and salts thereof can be determined by liquid chromatography.

The production method of the disclosure can also provide low-molecular-weight PTFE substantially free from C4-C14 perfluorosulfonic acids and salts thereof. The low-molecular-weight PTFE obtainable by the production method of the disclosure may contain C4-C14 perfluorosulfonic acids and salts thereof in an amount of less than 25 ppb by mass, preferably not more than 20 ppb by mass, more preferably not more than 15 ppb by mass, still more preferably not more than 10 ppb by mass, particularly preferably not more than 5 ppb by mass, most preferably less than 5 ppb by mass. The lower limit of the amount may be, but is not limited to, a value lower than the detection limit.

The amount of the perfluorosulfonic acids and salts thereof can be determined by liquid chromatography.

The low-molecular-weight PTFE preferably contains five or less carboxy groups at ends of the molecular chain per $10^6$ carbon atoms in the main chain. The number of carboxy groups is more preferably 4 or less, still more preferably 3 or less, per $10^6$ carbon atoms in the main chain. The lower limit thereof may be, but is not limited to, a value lower than the detection limit. The carboxy groups are generated at ends of the molecular chain of the low-molecular-weight PTFE by, for example, irradiation of the high-molecular-weight PTFE with the radiation in the presence of oxygen.

The number of carboxy groups is a value determined by the following method. The detection limit of this measurement method is 0.5.

Measurement Method

The following measurement is performed in conformity with the method of analyzing end groups described in JP H04-20507 A.

Low-molecular-weight PTFE powder is pre-formed with a hand press, so that a film having a thickness of about 0.1 mm is prepared. The resulting film is subjected to infrared absorption spectrum analysis. PTFE with completely fluorinated ends produced by a contact with fluorine gas is also subjected to infrared absorption spectrum analysis. Based on the difference spectrum therebetween, the number of end carboxy groups is calculated by the following formula.

Number of end carboxy groups (per $10^6$ carbon atoms)=$(l \times K)/t$ l: absorbance
K: correction coefficient
t: film thickness (mm)

The absorption frequency and correction coefficient of the carboxy group are respectively set to 3560 $cm^{-1}$ and 440.

The low-molecular-weight PTFE may contain, at ends of the molecular chain, unstable end groups derived from the chemical structure of a polymerization initiator or chain-transfer agent used in the polymerization reaction for the high-molecular-weight PTFE. Examples of the unstable end groups include, but are not limited to, —$CH_2OH$, —COOH, and —$COOCH_3$.

The low-molecular-weight PTFE may be one having undergone stabilization of the unstable end groups. The unstable end groups may be stabilized by any method, such as a method of exposing the unstable end groups to fluorine-containing gas to convert them into trifluoromethyl groups (—$CF_3$), for example.

The low-molecular-weight PTFE may contain amidated ends. The end amidation may be performed by any method, such as a method of bringing fluorocarbonyl groups (—COF) obtained by exposure to fluorine-containing gas into contact with ammonia gas as disclosed in JP H04-20507 A, for example.

The low-molecular-weight PTFE with stabilization or end amidation of the unstable end groups as described above can be well compatible with opposite materials and have improved dispersibility when used as an additive for opposite materials such as coating materials, greases, cosmetics, plating solutions, toners, and plastics.

The PTFE may be a homo-PTFE consisting only of a tetrafluoroethylene (TFE) unit or may be a modified PTFE containing a TFE unit and a modifying monomer unit based on a modifying monomer copolymerizable with TFE. In the production method of the disclosure, the composition of the polymer is not changed. Thus, the low-molecular-weight PTFE has the composition of the high-molecular-weight PTFE as it is.

The modified PTFE preferably contains the modifying monomer unit in an amount of 0.001 to 1% by mass, more preferably 0.01% by mass or more, while more preferably 0.5% by mass or less, still more preferably 0.1% by mass or less, of all monomer units. The term "modifying monomer unit" herein means a moiety that is part of the molecular structure of the modified PTFE and is derived from a modifying monomer. The term "all monomer units" herein means all moieties derived from monomers in the molecular structure of the modified PTFE. The amount of the modifying monomer unit can be determined by a known method such as Fourier transform infrared spectroscopy (FT-IR).

The modifying monomer may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; perfluoroalkylethylenes; and ethylene. One modifying monomer may be used, or multiple modifying monomers may be used.

Examples of the perfluorovinyl ether include, but are not limited to, perfluorinated unsaturated compounds represented by the following formula (1):

$$CF_2=CF-ORf \quad (1)$$

(wherein Rf is a perfluoroorganic group). The "perfluoroorganic group" herein means an organic group in which all the hydrogen atoms bonded to any carbon atom are replaced by fluorine atoms. The perfluoroorganic group may contain ether oxygen.

Examples of the perfluorovinyl ether include perfluoro (alkyl vinyl ethers) (PAVEs) represented by the formula (1) in which Rf is a C1-C10 perfluoroalkyl group. The perfluoroalkyl group preferably contains 1 to 5 carbon atoms.

Examples of the perfluoroalkyl group in the PAVE include perfluoromethyl, perfluoroethyl, perfluoropropyl, perfluorobutyl, perfluoropentyl, and perfluorohexyl groups. Preferred is perfluoro(propyl vinyl ether) (PPVE) in which the perfluoroalkyl group is a perfluoropropyl group.

Examples of the perfluorovinyl ether also include those represented by the formula (1) in which Rf is a C4-C9 perfluoro(alkoxyalkyl) group, those represented by the formula (1) in which Rf is a group represented by the following formula:

[Chem. 1]

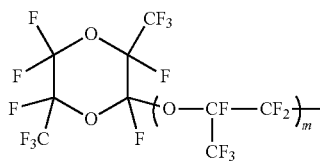

(wherein m is 0 or an integer of 1 to 4), and those represented by the formula (1) in which Rf is a group represented by the following formula:

[Chem. 2]

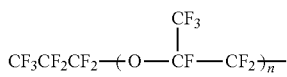

wherein n is an integer of 1 to 4.

Examples of the perfluoroalkylethylenes include, but are not limited to, (perfluorobutyl)ethylene (PFBE), (perfluorohexyl)ethylene, and (perfluorooctyl)ethylene.

The modifying monomer in the modified PTFE is preferably at least one selected from the group consisting of HFP, CTFE, VDF, PPVE, PFBE, and ethylene, more preferably at least one selected from the group consisting of HFP and CTFE.

The disclosure also relates to a powder including low-molecular-weight PTFE, the powder being substantially free from any of perfluorooctanoic acid and salts thereof, the low-molecular-weight PTFE having a melt viscosity at 380° C. of $1 \times 10^2$ to $7 \times 10^5$ Pa·s and satisfying a ratio P1/P2 of 3.30 or less and a ratio P2/P0 of 0.260 to 0.450 in a primary differential spectrum obtainable by electron spin resonance measurement, wherein P1 represents the maximum intensity of a negative signal within a g value range of 2.014 to 2.016, P2 represents the maximum intensity of the negative signal within the g value range of 2.006 to 2.008, and P0 represents the maximum intensity of a positive signal.

The low-molecular-weight PTFE in the powder of the disclosure shows the specific signals mentioned above in a primary differential spectrum (hereafter, also referred to as an ESR spectrum) obtainable by electron spin resonance (ESR) measurement. The powder of the disclosure can reduce discoloration thereof after heating, though the reason for this is not clear. In particular, the powder of the disclosure has high whiteness and is less yellowish even after heating. The powder of the disclosure may require pre-drying (heating) before being added to a matrix material in some cases. The powder of the disclosure may require heating at high temperature during processing in some cases. The powder of the disclosure capable of reducing discoloration such as yellowing due to heating is not likely to contaminate a matrix material.

The powder of the disclosure can provide, when added to matrix materials (in particular, to resins such as polycarbonate), a product excellent in tensile strength.

Low-molecular-weight PTFE obtainable by irradiating high-molecular-weight PTFE with radiation in the presence of a compound such as halogenated polymers described above or alcohols or low-molecular-weight PTFE obtainable by irradiating high-molecular-weight PTFE with radiation in the presence of oxygen does not show the above specific signals. The structure and percentage of radicals contained in the low-molecular-weight PTFE obtained by these methods are presumably different from those of the low-molecular-weight PTFE in the powder of the disclosure.

The measurement conditions of the ESR and definitions of related terms are described below.

The measurement conditions are as follows.
Device: JES-FR30EX available from JEOL Ltd.
Measurement temperature: 23±3° C.
Microwave frequency: 9.42 GHz
Microwave outputs: 0.4 mW
Center field: 347.548 mT
Sweep width: ±25 mT
Sweep time: 60 s
Time constant: 0.03 s
Field modulation width: 0.32 mT
Number of scans: 1
Modulation frequency: 100 kHz
Marker: $Mn^{2+}$ In the ESR spectrum, the vertical axis expresses a corrected signal intensity and the horizontal axis expresses a g value.

The corrected signal intensity is defined by the following expression:

corrected signal intensity $(mg^{-1})$=Int.[PTFE]/Int. $[Mn^{2+}]$/sample mass (mg)

wherein Int.[PTFE] represents a signal intensity of the sample before correction and Int.$[Mn^{2+}]$ represents a signal intensity of the marker.

When the term "intensity" is simply used herein in relation to the signal in the ESR spectrum of PTFE, it refers to the corrected signal intensity, unless otherwise specified.

The g value of ESR signals is defined by the following expression:

$$g=hv/\beta H$$

wherein h represents the Planck constant, v represents the frequency of the measurement electromagnetic wave, β represents the Bohr magneton, and H represents the field intensity at which the signal is obtained.

The g value used is a value corrected based on the known g values 2.034 and 1.981 which respectively correspond to the third and fourth peaks, among six peaks of $Mn^{2+}$ used as a marker, from the lower magnetic field side.

In the case where the base line of the ESR spectrum is shifted, the base line correction is performed such that the signal intensities at g values of around 2.05 and 1.98 are set to 0.

In the ESR spectrum, a positive signal refers to a signal appearing in a positive region (upper side of the base line) of the spectrum and a negative signal refers to a signal appearing in a negative region (lower side of the base line) of the spectrum.

The low-molecular-weight PTFE in the powder of the disclosure has a ratio P1/P2 of 3.30 or less in the ESR spectrum in which P1 represents the maximum intensity of a negative signal within a g value range of 2.014 to 2.016 (hereafter, also referred to as a range 1) and P2 represents the maximum intensity of a negative signal within the g value range of 2.006 to 2.008 (hereafter, also referred to as a range 2).

Here, the maximum intensity means the maximum absolute value of an intensity of a negative signal within the above range. A signal having P1 may be a signal corresponding to a minimum point within the range 1 and a signal having P2 may be a signal corresponding to a minimum point within the range 2.

The negative signal (peak) within the range 1 is considered to be a signal based on a radical 1 represented by the following formula:

 [Chem. 3]

(wherein the wave line represents a polymer chain of PTFE; the same applies hereafter), and the negative signal (peak) within the range 2 is considered to be a signal based on a radical 2 represented by the following formula.

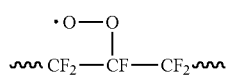 [Chem. 4]

A radical 3 represented by the following formula:

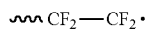 [chem. 5]

and a radical 4 represented by the following formula:

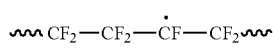 [Chem. 6]

are generated during the irradiation substantially in the absence of oxygen. When these radicals are brought into contact with air, they are considered to generate the radical 1 and the radical 2.

In contrast, in the irradiation in the presence of oxygen are directly generated the radical 1 and the radical 2. However, the radicals 2 are partly decomposed by the irradiation into the radicals 1. Accordingly, the percentage of the radicals 1 tends to be relatively large.

That the ratio P1/P2 is 3.30 or less means that the ratio of the radical 1 and the radical 2 present in the low-molecular-weight PTFE is within a specific range and, in particular, the percentage of the radical 1 is not so large.

The ratio P1/P2 is preferably 3.25 or less and 0.80 or more, more preferably 1.00 or more, still more preferably 1.10 or more.

The ratio P1/P2 can be set to 3.30 or less by irradiating high-molecular-weight PTFE with radiation substantially in the absence of oxygen.

The low-molecular-weight PTFE in the powder of the disclosure has a ratio P2/P0 of 0.260 to 0.450 in the ESR spectrum in which P2 represents the maximum intensity of a negative signal within the range 2 described above and P0 represents the maximum intensity of a positive signal.

Here, P0 means the maximum absolute value of the intensity of the positive signal. The signal having P0 may be a signal corresponding to the maximum point in the positive region of the ESR spectrum.

That the ratio P2/P0 is 0.260 or more means that the radical 2 is present in an amount not smaller than a specific level relative to the whole low-molecular-weight PTFE.

The ratio P2/P0 is preferably 0.265 or more.

The ratio P2/P0 can be set to 0.260 or more by irradiating high-molecular-weight PTFE with radiation substantially in the absence of oxygen.

That the ratio P2/P0 is 0.450 or less means that the radical 2 is present in an amount not larger than a specific level relative to the whole low-molecular-weight PTFE.

The ratio P2/P0 is preferably 0.400 or less.

The ratio P2/P0 can be set to 0.450 or less by irradiating high-molecular-weight PTFE with radiation even substantially in the absence of a compound such as halogenated polymers or alcohols.

The low-molecular-weight PTFE in the powder of the disclosure has a ratio P1/P0 of preferably 0.900 or less, more preferably 0.865 or less in the ESR spectrum in which P1 represents the maximum intensity of the negative signal within the range 1 described above and P0 represents the maximum intensity of the positive signal. The ratio P1/P0 is preferably 0.200 or more, more preferably 0.300 or more, still more preferably 0.400 or more.

That the ratio P1/P0 is within the above range means that the radical 1 is present in an amount equivalent to a specific level relative to the whole low-molecular-weight PTFE.

The ratio P1/P0 can be set within the above range by irradiating high-molecular-weight PTFE with radiation substantially in the absence of oxygen or irradiating high-molecular-weight PTFE substantially in the absence of a compound such as halogenated polymers or alcohols.

The positive signal having P0 may have a g value of 2.018 or more, 2.019 or more, or 2.020 or more. The g value may be 2.030 or less, 2.025 or less, or 2.024 or less.

These g values corresponding to the positive signal having P0 are values unique to PTFE.

FIG. 1 shows an example of P0, P1, and P2 in an ESR spectrum.

The low-molecular-weight PTFE in the powder of the disclosure has a melt viscosity at 380° C. of $1 \times 10^2$ to $7 \times 10^5$ Pa·s. The melt viscosity is preferably $1.5 \times 10^3$ Pa·s or more and $3.0 \times 10^5$ Pa·s or less, more preferably $1.0 \times 10^5$ Pa·s or less, still more preferably $9.0 \times 10^4$ Pa·s or less.

The composition, melting point, and ends of the molecular chain (the number of carboxy groups, unstable end groups and its stabilization or amidation) of the low-molecular-weight PTFE in the powder of the disclosure may be the same as those having been described for the low-molecular-weight PTFE obtainable by the production method of the disclosure.

The powder of the disclosure may substantially consist only of the low-molecular-weight PTFE. The amount of the low-molecular-weight PTFE relative to the powder may be 95.0% by mass or more, preferably 99.0% by mass or more, more preferably 99.5% by mass or more.

The powder of the disclosure is substantially free from perfluorooctanoic acid and salts thereof. The amount of the perfluorooctanoic acid and salts thereof relative to the powder may be less than 25 ppb by mass, preferably not more than 20 ppb by mass, more preferably not more than 15 ppb by mass, still more preferably not more than 10 ppb by mass, particularly preferably not more than 5 ppb by mass, most preferably less than 5 ppb by mass. The lower limit may be, but not limited to, a value lower than the detection limit.

The powder of the disclosure is preferably substantially free from any of C4-C14 perfluorocarboxylic acids and salts thereof. The total amount of the perfluorocarboxylic acids and salts thereof relative to the powder may be not more than 50 ppb by mass, preferably less than 25 ppb by mass, more preferably not more than 20 ppb by mass, still more preferably not more than 15 ppb by mass, further preferably not more than 10 ppb by mass, particularly preferably not more than 5 ppb by mass, most preferably less than 5 ppb by mass. The lower limit of the amount may be, but is not limited to, a value lower than the detection limit.

The powder of the disclosure is also preferably substantially free from C4-C14 perfluorosulfonic acids and salts thereof. The amount of the perfluorosulfonic acids and salts thereof may be less than 25 ppb by mass, preferably not more than 20 ppb by mass, more preferably not more than 15 ppb by mass, still more preferably not more than 10 ppb by mass, further preferably not more than 5 ppb by mass, most preferably less than 5 ppb by mass. The lower limit of the amount may be, but is not limited to, a value lower than the detection limit.

The powder of the disclosure preferably has a specific surface area of 0.5 to 20 m$^2$/g.

The powder of the disclosure has an average particle size of preferably 0.5 to 200 µm, more preferably 100 µm or less, still more preferably 50 µm or less, further preferably 25 µm or less, particularly preferably 10 µm or less. The powder having such a comparatively small average particle size can form a film having better surface smoothness when used as an additive for a coating material, for example.

The powder of the disclosure is obtainable by producing low-molecular-weight PTFE in the form of powder by the production method of the disclosure described above.

The low-molecular-weight PTFE obtainable by the production method of the disclosure and the powder of the disclosure each can suitably be used as a molding material, an ink, a cosmetic, a coating material, a grease, a component for office automation devices, an additive for modifying toners, an organic photoconductor material for copiers, and an additive for plating solutions, for example. Examples of the molding material include engineering plastics such as polyoxybenzoyl polyester, polyimide, polyamide, polyamide-imide, polyacetal, polycarbonate, and polyphenylene sulfide. The low-molecular-weight PTFE is particularly suitable as a thickening agent for greases.

The low-molecular-weight PTFE and the powder each can suitably be used as an additive for molding materials for improving the non-adhesiveness and slidability of rollers of copiers, for improving the texture of molded articles of engineering plastics, such as surface sheets of furniture, dashboards of automobiles, and covers of home appliances, and for improving the smoothness and abrasion resistance of machine elements generating mechanical friction, such as light-load bearings, gears, cams, buttons of push-button telephones, movie projectors, camera components, and sliding materials, and as a processing aid for engineering plastics, for example.

The low-molecular-weight PTFE and the powder each can be used as an additive for coating materials for the purpose of improving the smoothness of varnish and paint. The low-molecular-weight PTFE can be used as an additive for cosmetics for the purpose of improving the smoothness of cosmetics such as foundation.

The low-molecular-weight PTFE and the powder each can also be suitably used for improving the oil or water repellency of wax and for improving the smoothness of greases and toners.

The low-molecular-weight PTFE and the powder each can be used as an electrode binder of secondary batteries and fuel cells, a hardness adjuster for electrode binders, and a water repellent for electrode surfaces.

The low-molecular-weight PTFE or the powder may be combined with a lubricant to provide grease. The grease is characterized by containing the low-molecular-weight PTFE or the powder and a lubricant. Thus, the low-molecular-weight PTFE or the powder is uniformly and stably dispersed in the lubricant and the grease exhibits excellent performance such as load resistance, electric insulation, and low moisture absorption.

The lubricant (base oil) may be either mineral oil or synthetic oil. Examples of the lubricant (base oil) include paraffinic or naphthenic mineral oils, and synthetic oils such as synthetic hydrocarbon oils, ester oils, fluorine oils, and silicone oils. In terms of heat resistance, fluorine oils are preferred. Examples of the fluorine oils include perfluoropolyether oil and polychlorotrifluoroethylene with a low polymerization degree. The polychlorotrifluoroethylene with a low polymerization degree may have a weight average molecular weight of 500 to 1200.

The grease may further contain a thickening agent. Examples of the thickening agent include metal soaps, composite metal soaps, bentonite, phthalocyanin, silica gel, urea compounds, urea/urethane compounds, urethane compounds, and imide compounds. Examples of the metal soaps include sodium soap, calcium soap, aluminum soap, and lithium soap. Examples of the urea compounds, urea/urethane compounds, and urethane compounds include diurea compounds, triurea compounds, tetraurea compounds, other polyurea compounds, urea/urethane compounds, diurethane compounds, and mixtures thereof.

The grease preferably contains the low-molecular-weight PTFE or the powder in an amount of 0.1 to 60% by mass, more preferably 0.5% by mass or more, still more preferably 5% by mass or more, while more preferably 50% by mass or less. A grease containing too large an amount of the low-molecular-weight PTFE or the powder may be too hard to exert sufficient lubrication. A grease containing too small an amount of the low-molecular-weight PTFE or the powder may fail to exert the sealability.

The grease may also contain any of additives such as solid lubricants, extreme pressure agents, antioxidants, oilness agents, anticorrosives, viscosity index improvers, and detergent dispersants.

The disclosure relates to a method for producing low-molecular-weight polytetrafluoroethylene, the method including: (1) irradiating high-molecular-weight polytetrafluoroethylene with radiation to a dose of 250 kGy or higher substantially in the absence of oxygen to provide low-molecular-weight polytetrafluoroethylene having a melt viscosity at 380° C. of $1.0 \times 10^2$ to $7.0 \times 10^5$ Pa·s.

The high-molecular-weight polytetrafluoroethylene preferably has a standard specific gravity of 2.130 to 2.230.

The high-molecular-weight polytetrafluoroethylene and the low-molecular-weight polytetrafluoroethylene are each preferably in the form of powder.

The production method preferably further includes, before the step (1), (3) heating the high-molecular-weight polytetrafluoroethylene up to a temperature that is not lower than a primary melting point thereof to provide a molded article, the molded article having a specific gravity of 1.0 g/cm$^3$ or higher.

The disclosure also relates to a low-molecular-weight polytetrafluoroethylene obtainable by the production method.

The disclosure also relates to a powder including low-molecular-weight polytetrafluoroethylene, the powder being substantially free from any of perfluorooctanoic acid and salts thereof, the low-molecular-weight polytetrafluoroethylene having a melt viscosity at 380° C. of $1 \times 10^2$ to $7 \times 10^5$ Pa·s and satisfying a ratio P1/P2 of 3.30 or less and a ratio P2/P0 of 0.260 to 0.450 in a primary differential spectrum obtainable by electron spin resonance measurement, wherein P1 represents a maximum intensity of a negative signal within a g value range of 2.014 to 2.016, P2 represents a maximum intensity of the negative signal within the g value range of 2.006 to 2.008, and P0 represents a maximum intensity of a positive signal.

In the powder, the perfluorooctanoic acid and salts thereof amount to less than 25 ppb by mass.

The powder preferably has a specific surface area of 0.5 to 20 m$^2$/g.

EXAMPLES

The disclosure is more specifically described below with reference to examples. Still, the disclosure is not intended to be limited to the examples.

The parameters in the examples were determined by the following methods.

Melt Viscosity

The melt viscosity was determined by heating a 2-g sample at 380° C. for five minutes in advance and then keeping this sample at this temperature under a load of 0.7 MPa using a flow tester (available from Shimadzu Corp.) and a 2ϕ-8L die in conformity with ASTM D1238.

Measurement by electron spin resonance (ESR)
Device: JES-FR30EX available from JEOL Ltd.
Measurement temperature: 23±3° C.
Microwave frequency: 9.42 GHz
Microwave outputs: 0.4 mW
Center field: 347.548 mT
Sweep width: ±25 mT
Sweep time: 60 s
Time constant: 0.03 s
Field modulation width: 0.32 mT
Number of scans: 1
Modulation frequency: 100 kHz
Marker: $Mn^{2+}$ Amount of Perfluorooctanoic Acid and Salts Thereof (PFOA)

The amount of perfluorooctanoic acid and salts thereof was determined using a liquid chromatography-mass spectrometer (LC-MS ACQUITY UPLC/TQD, Waters). First, 1 g of measurement powder was mixed with 5 mL of acetonitrile and the mixture was sonicated for 60 minutes, so that perfluorooctanoic acid was extracted. The resulting liquid phase was analyzed by multiple reaction monitoring (MRM). Acetonitrile (A) and an aqueous ammonium acetate solution (20 mmol/L) (B) were delivered at a predetermined concentration gradient (A/B=40/60 for 2 min and 80/20 for 1 min) as mobile phases. A separation column (ACQUITY UPLC BEH C18 1.7 µm) was used at a column temperature of 40° C. and an injection volume of 5 µL. Electrospray ionization (ESI) in a negative mode was used for ionization, the cone voltage was set to 25 V, and the ratio of the molecular weight of precursor ions to the molecular weight of product ions was measured to be 413/369. The amount of perfluorooctanoic acid and salts thereof was calculated by the external standard method. The detection limit of this measurement is 5 ppb.

Oxygen Concentration in Airtight Container

The oxygen concentration was determined by analyzing a gaseous layer inside the airtight container by gas chromatography. Moreover, the color tone of oxygen detection paper enclosed in the airtight container was observed to change from blue to pink, which demonstrated that the oxygen concentration was less than 0.1 vol % (oxygen free).

Example 1

A 50-g portion of PTFE fine powder (standard specific gravity measured in conformity with ASTM D 4895: 2.175, PFOA concentration was lower than the detection limit) weighed was put into a barrier nylon bag.

An iron-based self-reactive oxygen adsorbent (AGELESS ZP-100 available from Mitsubishi Gas Chemical Company) was further put in the barrier nylon bag as an oxygen adsorbent. The resulting bag was sealed by heat sealing. The absence of oxygen was confirmed using oxygen detection paper placed in the bag in advance, and then the PTFE fine powder in the bag was irradiated with 300 kGy of cobalt-60γ rays at an ambient temperature of 20° C. to 45° C. Thus, a low-molecular-weight PTFE powder was obtained. The ambient temperature during the irradiation is a temperature including heat generated during the irradiation (the same shall apply to the following examples and comparative examples).

The physical properties of the resulting low-molecular-weight PTFE powder were determined. Before determination of the physical properties, the bag was opened after the irradiation and the obtained powder was held in the air for about 30 minutes. Table 1 shows the results.

Figure 2:
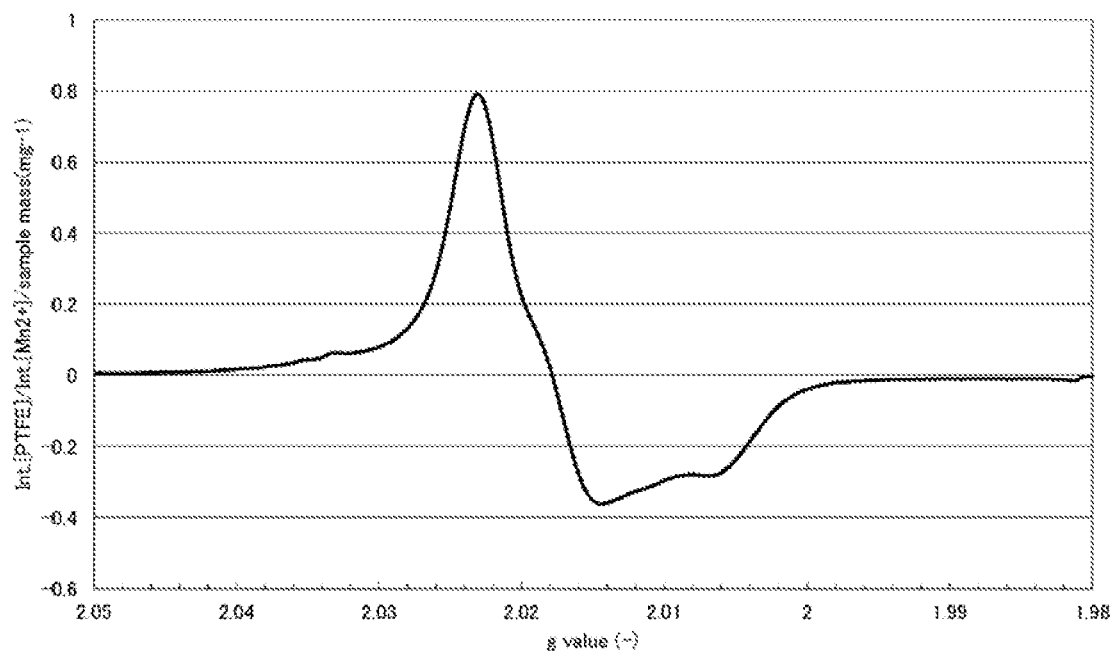
FIG. 2 is a diagram showing the ESR spectrum of a low-molecular-weight PTFE powder obtained in Example 1.

FIG. 2 shows a primary differential spectrum obtained by ESR measurement.

Example 2

A low-molecular-weight PTFE powder was obtained as in Example 1, except that the irradiation was performed using 400 kGy of cobalt-60γ rays.

The physical properties of the obtained low-molecular-weight PTFE powder were determined as in Example 1. Table 1 shows the results.

Figure 3:
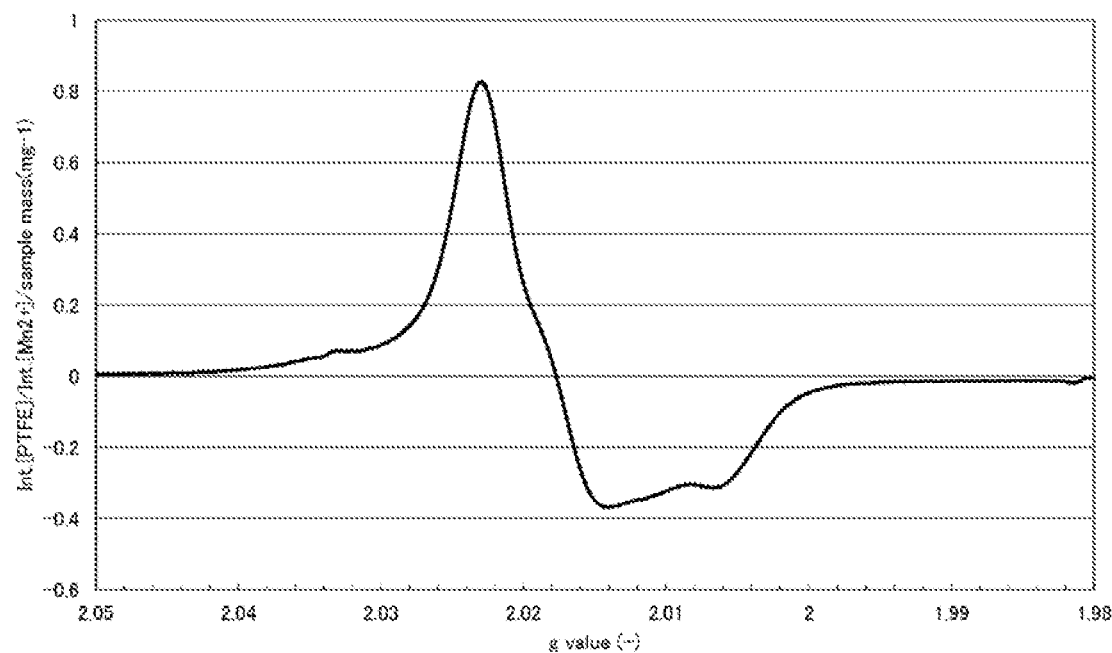
FIG. 3 is a diagram showing the ESR spectrum of a low-molecular-weight PTFE powder obtained in Example 2.

FIG. 3 shows a primary differential spectrum obtained by ESR measurement.

Example 3

A low-molecular-weight PTFE powder was obtained as in Example 1, except that the irradiation was performed using 500 kGy of cobalt-60γ rays.

The physical properties of the obtained low-molecular-weight PTFE powder were determined as in Example 1. Table 1 shows the results.

Figure 4:
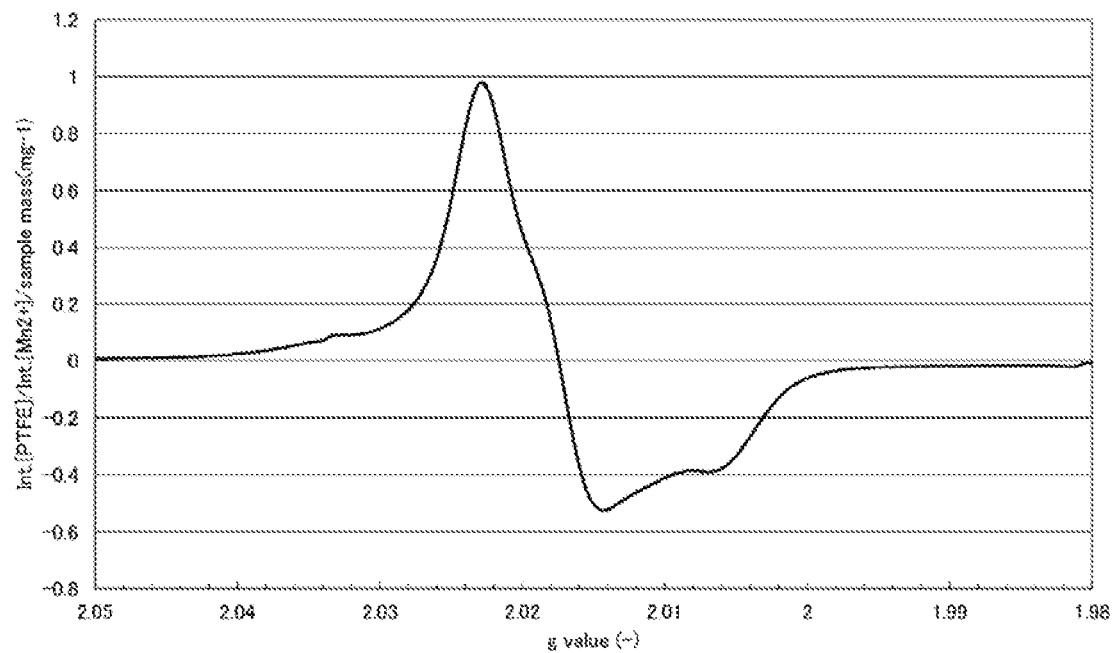
FIG. 4 is a diagram showing the ESR spectrum of a low-molecular-weight PTFE powder obtained in Example 3.

FIG. 4 shows a primary differential spectrum obtained by ESR measurement.

Example 4

A low-molecular-weight PTFE powder was obtained as in Example 1, except that the oxygen concentration in the bag during the irradiation using 300 kGy of cobalt-60γ rays was set to 0.2 vol %. The physical properties of the obtained low-molecular-weight PTFE powder were determined as in Example 1. Table 1 shows the results.

Example 5

A low-molecular-weight PTFE powder was obtained as in Example 1, except that the irradiation was performed using 400 kGy of cobalt-60γ rays. The physical properties of the obtained low-molecular-weight PTFE powder were determined as in Example 1. Table 1 shows the results.

The oxygen concentration in Examples 4 and 5 was measured using a zirconia oxygen analyzer LC-860 available from Toray Engineering Co., Ltd.

Comparative Example 1

A low-molecular-weight PTFE powder was obtained as in Example 1, except that the irradiation was performed using 200 kGy of cobalt-60γ rays.

The physical properties of the obtained low-molecular-weight PTFE powder were determined as in Example 1. Table 1 shows the results.

Figure 5:
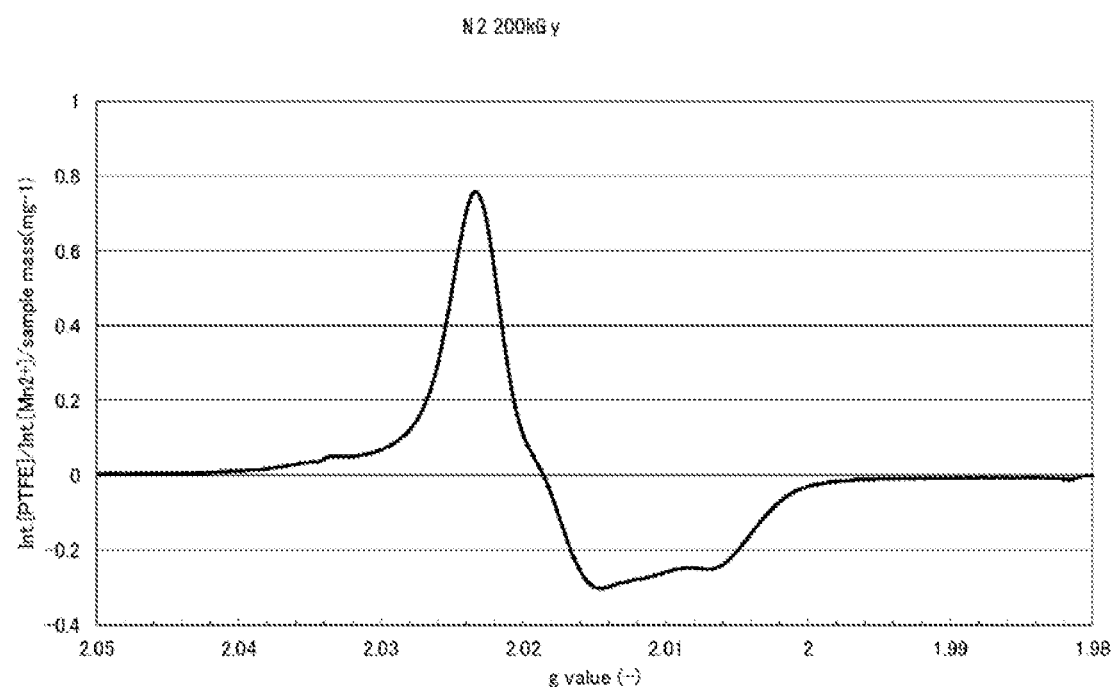
FIG. 5 is a diagram showing the ESR spectrum of a low-molecular-weight PTFE powder obtained in Comparative Example 1.

FIG. 5 shows a primary differential spectrum obtained by ESR measurement.

Comparative Example 2

A 50-g portion of PTFE fine powder (standard specific gravity measured in conformity with ASTM D 4895: 2.175, PFOA concentration was lower than the detection limit) weighed was put into a barrier nylon bag. The atmosphere inside the bag was replaced by nitrogen gas 10 times and then by air (oxygen:nitrogen=21:79 (vol %)) five times to allow the bag to have an air atmosphere. Subsequently, the bag was sealed by heat sealing. The PTFE fine powder in the bag was irradiated with 300 kGy of cobalt-60γ rays at an ambient temperature of 20° C. to 45° C. Thus, a low-molecular-weight PTFE powder was obtained.

The physical properties of the resulting low-molecular-weight PTFE powder were determined as in Example 1. Table 1 shows the results.

Figure 6:
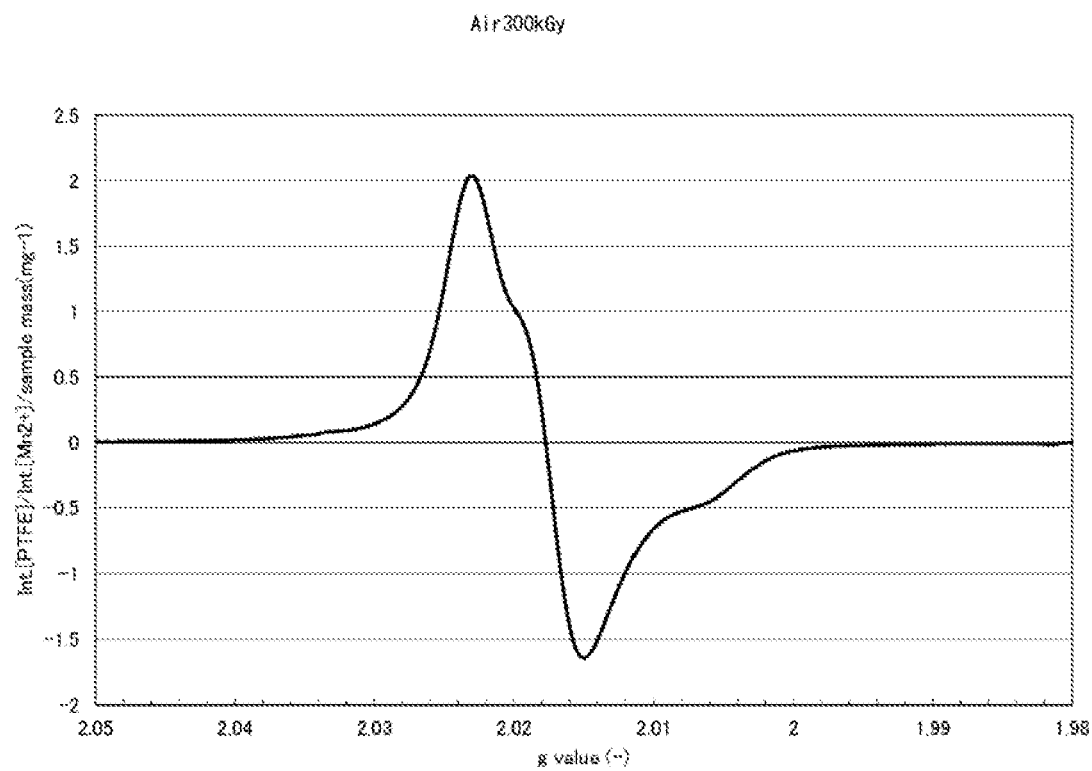
FIG. 6 is a diagram showing the ESR spectrum of a low-molecular-weight PTFE powder obtained in Comparative Example 2.

FIG. 6 shows a primary differential spectrum obtained by ESR measurement.

Comparative Example 3

A low-molecular-weight PTFE powder was obtained as in Comparative Example 2, except that the irradiation was performed using 400 kGy of cobalt-60γ rays.

The physical properties of the obtained low-molecular-weight PTFE powder were determined as in Example 1. Table 1 shows the results.

Figure 7:
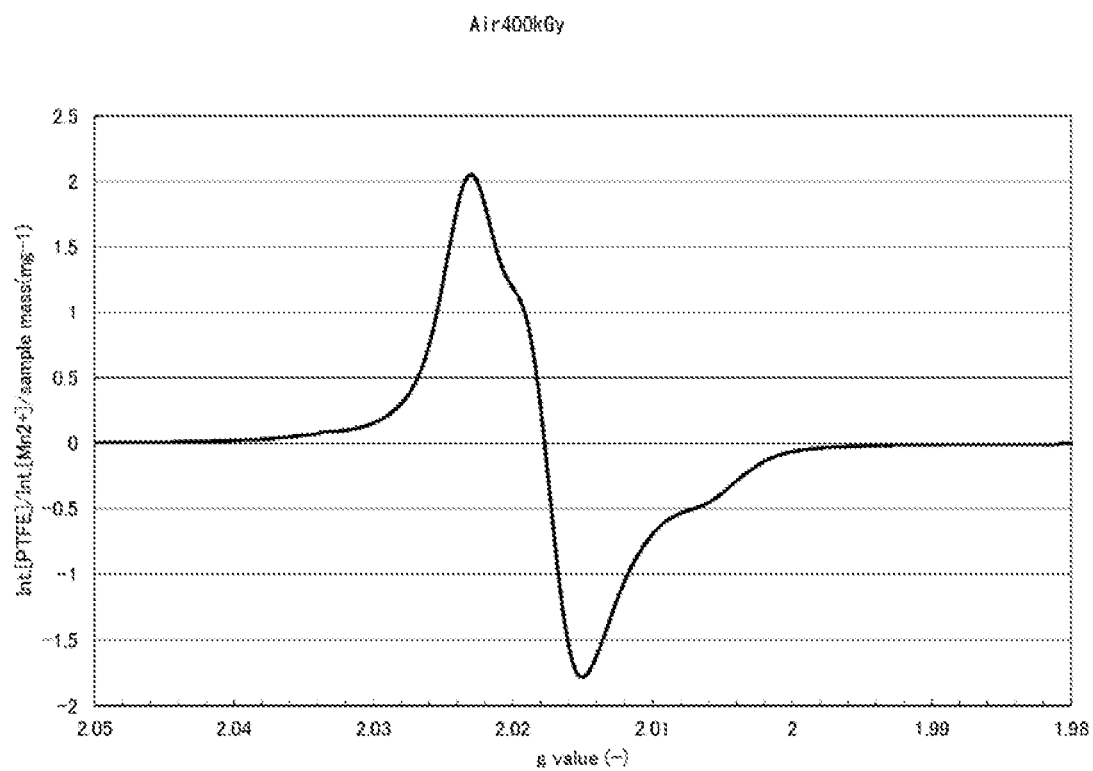
FIG. 7 is a diagram showing the ESR spectrum of a low-molecular-weight PTFE powder obtained in Comparative Example 3

FIG. 7 shows a primary differential spectrum obtained by ESR measurement.

Comparative Example 4

A low-molecular-weight PTFE powder was obtained as in Comparative Example 2, except that the irradiation was performed using 500 kGy of cobalt-60γ rays.

The physical properties of the obtained low-molecular-weight PTFE powder were determined as in Example 1. Table 1 shows the results.

Figure 8:
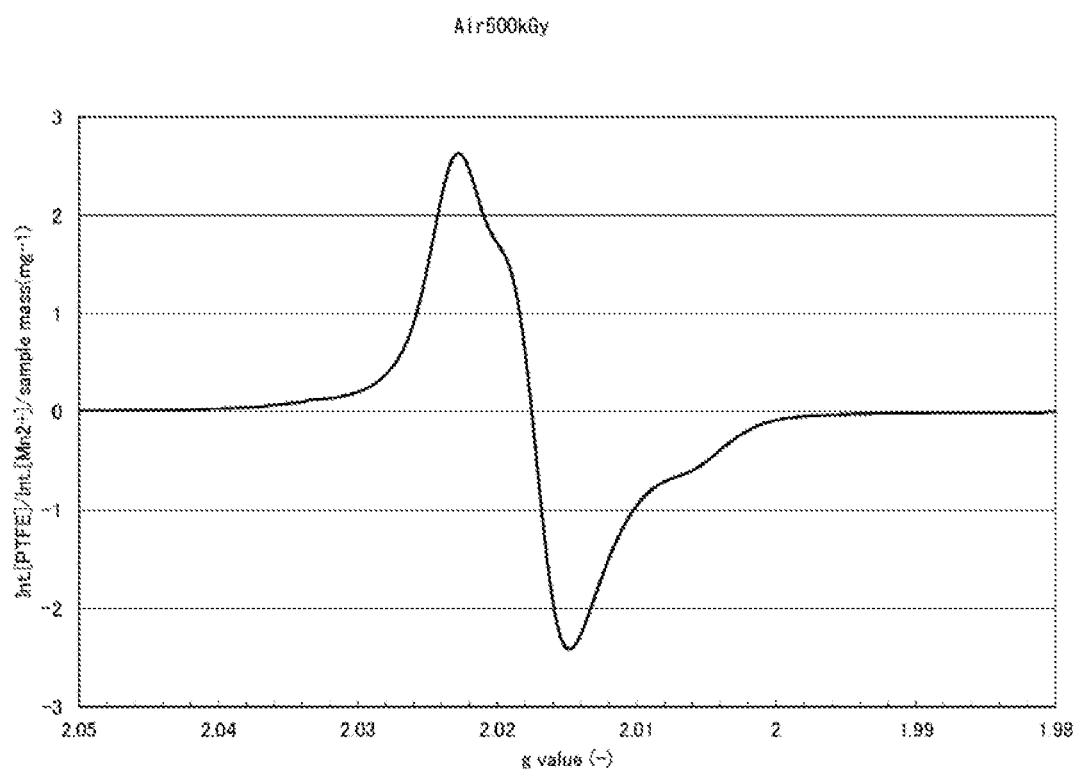
FIG. 8 is a diagram showing the ESR spectrum of a low-molecular-weight PTFE powder obtained in Comparative Example 4

FIG. 8 shows a primary differential spectrum obtained by ESR measurement.

Comparative Example 5

A 45-g portion of PTFE fine powder (standard specific gravity measured in conformity with ASTM D 4895: 2.175, PFOA concentration was lower than the detection limit) weighed was put into a barrier nylon bag, and 5 g of PCTFE (PCTFE M-400H available from Daikin Industries, Ltd.) was added thereto as a halogenated polymer. The atmosphere inside the bag was replaced by nitrogen gas 10 times to allow the bag to have a nitrogen atmosphere. Subsequently, the bag was sealed by heat sealing. The oxygen concentration inside the sealed bag after the replacement was 50 ppm.

The absence of oxygen inside the bag was confirmed using oxygen detection paper placed in the bag in advance, and then the PTFE fine powder in the bag was irradiated with 200 kGy of cobalt-60γ rays at an ambient temperature of 20° C. to 45° C. Thus, a low-molecular-weight PTFE powder was obtained.

The physical properties of the resulting low-molecular-weight PTFE powder were determined as in Example 1. Table 1 shows the results.

Figure 9:
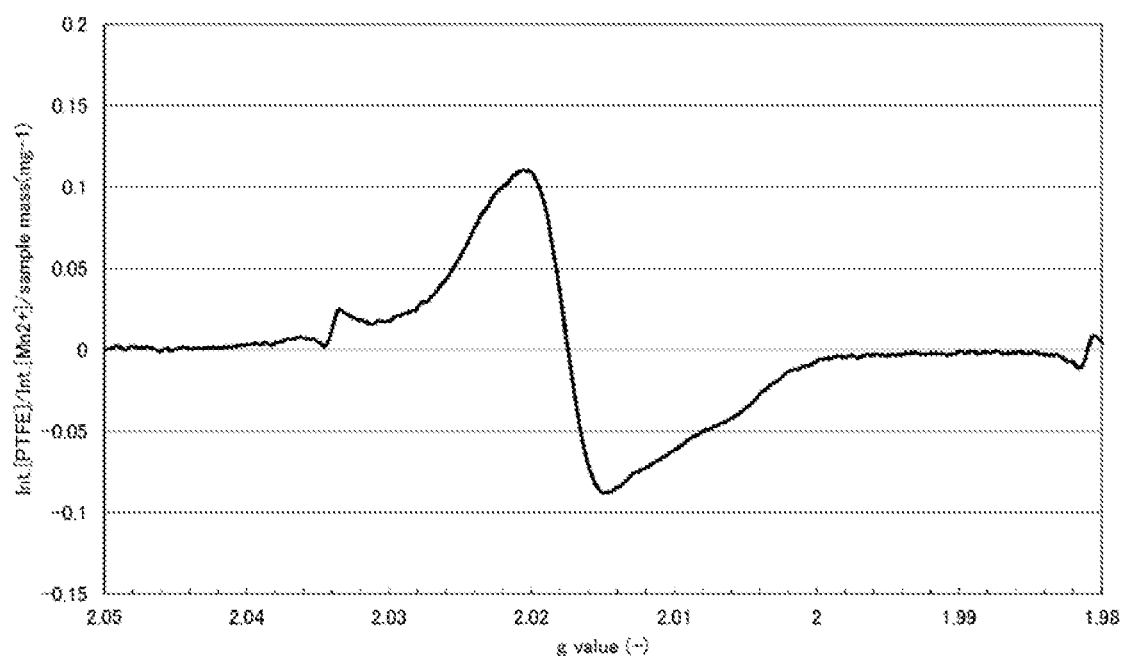
FIG. 9 is a diagram showing the ESR spectrum of a low-molecular-weight PTFE powder obtained in Comparative Example 5.

FIG. 9 shows a primary differential spectrum obtained by ESR measurement.

TABLE 1

| | Atmosphere | Irradiation dose (Absorbed dose) (kGy) | PFOA amount (ppb) | Melt viscosity (Pa·s) | Maximum (positive peak) Peak top g value (—) | Maximum (positive peak) Peak top intensity absolute value P0 (mg$^{-1}$) | Minimum (negative peak) (left) Peak top g value (—) | Minimum (negative peak) (left) Peak top intensity absolute value P1 (mg$^{-1}$) | Minimum (negative peak) (right) Peak top g value (—) | Minimum (negative peak) (right) Peak top intensity absolute value P2 (mg$^{-1}$) | P1/P2 | P2/P0 |
|---|---|---|---|---|---|---|---|---|---|---|---|---|
| Example 1 | Oxygen-free | 300 | 18 | 6.3 × 10$^4$ | 2.0232 | 0.7913 | 2.0146 | 0.3621 | 2.0068 | 0.2839 | 1.2756 | 0.3587 |
| Example 2 | Oxygen-free | 400 | 22 | 2.8 × 10$^4$ | 2.0230 | 0.8266 | 2.0143 | 0.3674 | 2.0067 | 0.3135 | 1.1719 | 0.3793 |

TABLE 1-continued

| | | | | | Maximum (positive peak) | | Minimum (negative peak) (left) | | Minimum (negative peak) (right) | | | |
|---|---|---|---|---|---|---|---|---|---|---|---|---|
| | Atmosphere | Irradiation dose (Absorbed dose) (kGy) | PFOA amount (ppb) | Melt viscosity (Pa·s) | Peak top g value (—) | Peak top intensity absolute value P0 (mg$^{-1}$) | Peak top g value (—) | Peak top intensity absolute value P1 (mg$^{-1}$) | Peak top g value (—) | Peak top intensity absolute value P2 (mg$^{-1}$) | P1/P2 | P2/P0 |
| Example 3 | Oxygen-free | 500 | 23 | 1.3 × 10$^4$ | 2.0229 | 0.9796 | 2.0144 | 0.5263 | 2.0068 | 0.3915 | 1.3441 | 0.3997 |
| Example 4 | Oxygen concentration 0.2% | 300 | 10 | 4.0 × 10$^4$ | — | — | — | — | — | — | — | — |
| Example 5 | Oxygen concentration 0.2% | 400 | 12 | 1.5 × 10$^4$ | — | — | — | — | — | — | — | — |
| Comparative Example 1 | Oxygen-free | 200 | 10 | Insoluble | 2.0234 | 0.7579 | 2.0146 | 0.3028 | 2.0072 | 0.2517 | 1.2030 | 0.3321 |
| Comparative Example 2 | Air | 300 | 291 | 2.7 × 10$^3$ | 2.0230 | 2.0365 | 2.0149 | 1.6432 | 2.0079 | 0.5253 | 3.1284 | 0.2579 |
| Comparative Example 3 | Air | 400 | 436 | 6.0 × 10$^2$ | 2.0230 | 2.0503 | 2.0150 | 1.7842 | 2.0080 | 0.5362 | 3.3276 | 0.2615 |
| Comparative Example 4 | Air | 500 | 800 | 2.0 × 10$^2$ | 2.0228 | 2.6305 | 2.0148 | 2.4125 | 2.0080 | 0.7081 | 3.4072 | 0.2692 |
| Comparative Example 5 | Oxygen-free | 200 | 7 | 6.6 × 10$^4$ | 2.0206 | 0.1105 | 2.0150 | 0.0881 | 2.0080 | 0.0502 | 1.7564 | 0.4542 |

The term "Insoluble" for the melt viscosity means that the molecular weight is large to the degree that it cannot be expressed in terms of the melt viscosity.

Examples 6 and 7 and Comparative Example 6

The b value and Z value of each of the low-molecular-weight PTFE powders obtained in Examples 1 and 3 and Comparative Example 5 were measured using a colorimeter (ZE 6000, available from Nippon Denshoku Industries Co., Ltd., light source: C light source).

A 1-g portion of each of the low-molecular-weight PTFE powders obtained in Examples 1 and 3 and Comparative Example 5 was put into an aluminum cup and heated at 150° C. for 15 hours. The resulting powder was cooled and left to stand for one day. Then, the b value and Z value of the powder were measured as described above.

Table 2 shows the results.

A larger b value indicates stronger yellowness and a larger Z value indicates higher whiteness.

TABLE 2

| | | b value | | Z value | |
|---|---|---|---|---|---|
| | PTFE used | before heating | after heating | before heating | after heating |
| Example 6 | Example 1 | 1.5 | 1.5 | 100.5 | 100.6 |
| Example 7 | Example 3 | 1.4 | 1.4 | 100.5 | 100.5 |
| Comparative Example 6 | Comparative Example 5 | 1.4 | 1.8 | 100.3 | 97.6 |

According to the results of Examples 6 and 7 and Comparative Example 6, the powders of Examples 1 and 3 did not suffer a change in yellowing or whiteness by heating, while the powder of Comparative Example 5 had stronger yellowness and lower whiteness by heating.

Examples 8 and 9 and Comparative Example 7

A 300-g portion of each of the low-molecular-weight PTFE powder obtained in Examples 1 and 3 and Comparative Example 5 was mixed with 2700 g of polycarbonate (PC). The mixture was kneaded at 260° C. using a twin-screw extruder, thereby obtaining PC pellets containing 10% by mass of low-molecular-weight PTFE. The PC pellets were heated at 120° C. for 15 hours to be dried, and molded into a plate using an injection molding machine at 280° C.

The b value and Z value of the plate were measured using a colorimeter as in Example 4.

The tensile strength of the plate was measured using an autograph (Shimadzu Corporation).

Table 3 shows the results.

In the table, the b value indicates a difference with the b value of the low-molecular-weight PTFE powder before heating (value measured in each of Examples 6 and 7 and Comparative Example 6).

TABLE 3

| | PTFE used | b value | Z value | Tensile strength (MPa) |
|---|---|---|---|---|
| Example 8 | Example 1 | +1.01 | 82.8 | 56 |
| Example 9 | Example 3 | +1.03 | 81.9 | 57 |
| Comparative Example 7 | Comparative Example 5 | +2.87 | 64.1 | 51 |

According to the results of Examples 8 and 9 and Comparative Example 7, the powders of Examples 1 and 3 are less likely to suffer yellowing along with the processing involving heating and a reduction in whiteness, compared to the powder of Comparative Example 5. The PC plate containing the powder of Examples 1 and the PC plate containing the powder of Example 3 are excellent in tensile strength, compared to the PC plate containing the powder of Comparative Example 5.

For PC products, a change in yellowness or whiteness is not preferred from the standpoint of design quality and a decrease in strength is not preferred from the standpoint of durability.

What is claimed is:

1. A powder comprising low-molecular-weight polytetrafluoroethylene,
    the powder being substantially free from any of perfluorooctanoic acid and salts thereof,
    the low-molecular-weight polytetrafluoroethylene having a melt viscosity at 380° C. of $1 \times 10^2$ to $7 \times 10^5$ Pa·s and satisfying a ratio P1/P2 of 3.30 or lower and a ratio P2/P0 of 0.260 to 0.450 in a primary differential spectrum obtainable by electron spin resonance measurement, wherein P1 represents a maximum intensity of a negative signal within a g value range of 2.014 to 2.016, P2 represents a maximum intensity of the negative signal within the g value range of 2.006 to 2.008, and P0 represents a maximum intensity of a positive signal,
    wherein the powder is free from a powder obtained by irradiating high-molecular-weight polytetrafluoroethylene with radiation in the presence of 0.001% by mass or more of at least one selected from the group consisting of hydrocarbons, chlorinated hydrocarbons, alcohols, and carboxylic acids.

2. The powder according to claim 1, wherein the perfluorooctanoic acid and salts thereof amount to less than 25 ppb by mass.

3. The powder according to claim 1, having a specific surface area of 0.5 to 20 $m_2/g$.

* * * * *